May 28, 1940.                F. Y. DONALDSON                2,202,549
                          INTERMITTENT FLOW DEVICE
                             Filed June 7, 1939
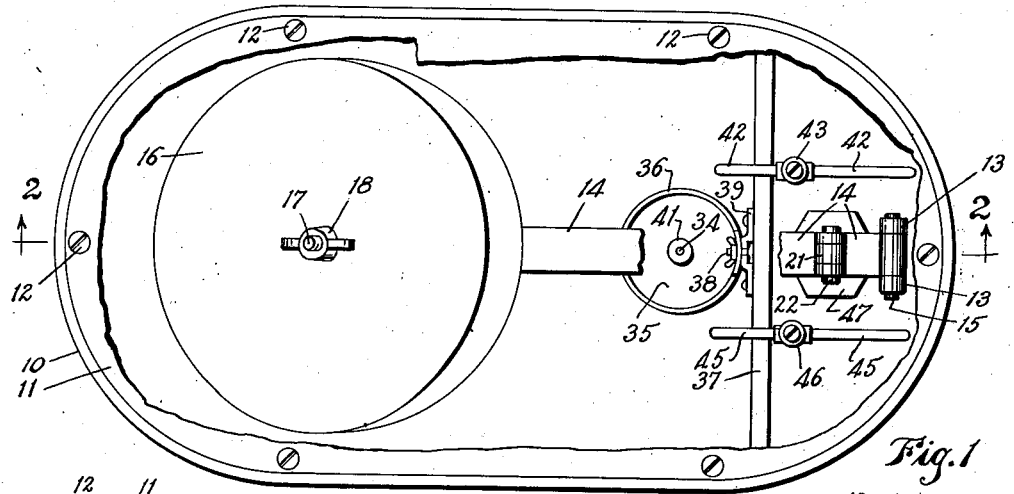
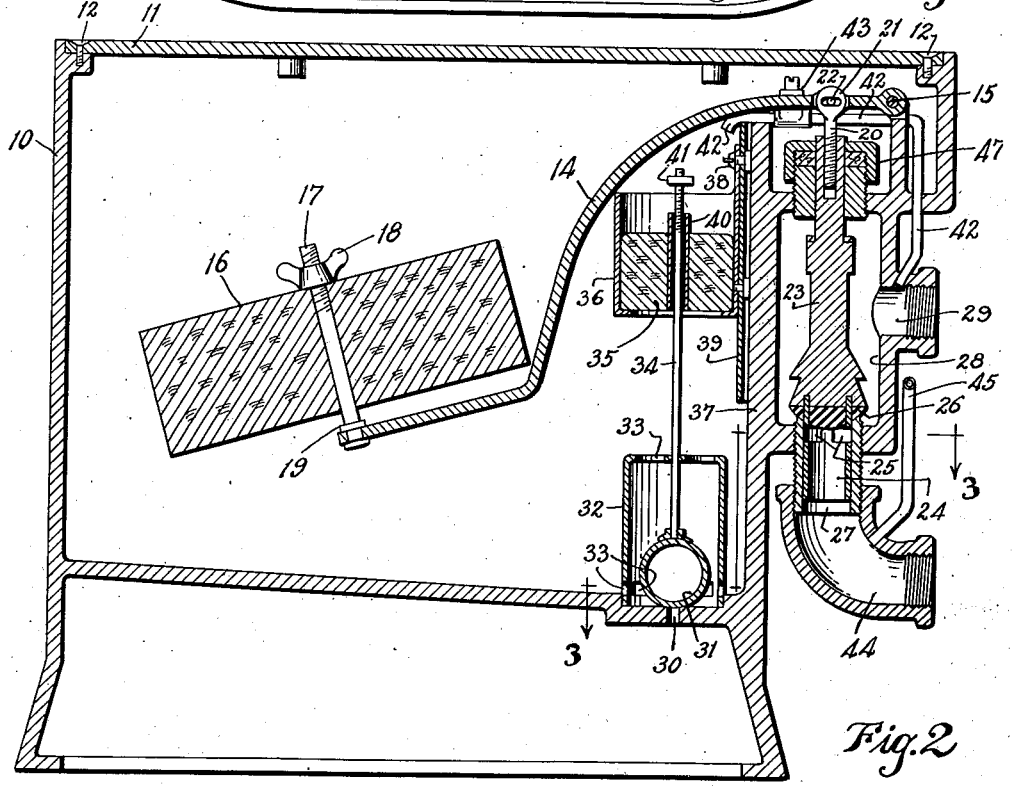
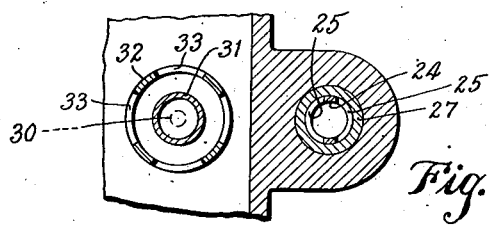
INVENTOR.
Frank Y. Donaldson
BY  Henry Molz
                    ATTORNEY.

Patented May 28, 1940

2,202,549

UNITED STATES PATENT OFFICE 2,202,549

INTERMITTENT FLOW DEVICE

Frank Y. Donaldson, Glendale, Calif.

Application June 7, 1939, Serial No. 277,828

4 Claims. (Cl. 137—163)

The primary object of my invention, is the provision of a device for attachment to sprinkling, irrigating and other watering systems of similar type, and whereby operating control of the system may economically, effectively and automatically be brought about.

An object is the provision of a device permitting intermittent operation of the watering system as to both time and flow.

A further object is the provision of a device readily attachable to existing systems as well as for new installations.

A further object is the provision of a device having but few parts, practically fool proof, and adaptable for production in varying sizes and capacity.

And a further object is the provision of a device embracing said advantages which may be regulated as to time and volume of flow at will, and when so regulated, requires no further care and attention.

And a still further object is the production of a device embracing said characteristics equally and as effectively suitable for automatically controlling the flow of water from lawn sprinklers, for example, of the ordinary residence lawn type, as well as those employed in sprinkling golf courses, country club grounds, cemetery, and large estate lawns regardless of type or capacity in use, and for irrigating systems of various types and other watering systems irrespective of purpose and use.

I attain these objects by the device illustrated in the accompanying drawing, in which:

Figure 1 is a top plan view with the cover broken away to show the interior of the case or housing structure.

Figure 2 is a vertical section on line 2—2 of Figure 1, and

Figure 3 is a section on line 3—3 of Figure 2.

Similar numerals of reference indicate like parts throughout the several views, thus the numeral 10 indicates a tank housing the operating mechanism comprising the device, a water tight lid or cover 11 enclosing the same by means of screws 12 or the like, adaptable to said purpose.

A lug 13 is provided within the tank. To it, one end of a float support arm 14 is pivotally secured as at 15. The other end supports a cork or similar float. It is thereto attached by means of a bolt 17 and thumb-nut 18.

Washers 19 are interposed between the float and the arm. In number, these may be increased or decreased at will by simply removing the thumb-nut 18 and float, making the desired and replacing the float and thumb-nut securing same. Said means of adjustment of the float readily serves the purpose hereinafter described. The bolt may also be secured to the arm in the opposite direction from that shown in Figure 2, and in which position the washers and float would appear under the arm. This method of attachment admits of a further means of adjustment.

A screw 20 is pivoted through its slotted head 21 and a pin 22 to the arm 14 relatively near the pivot 15.

Axially aligned with the screw 20 and suspended from the arm thereby, is a valve stem 23 carrying a hollow sliding valve 24 having ports 25 through the walls of the valve.

A rubber or composition washer 26 is provided on the valve stem 23 adjacent the ports so that upon closure of the valve following entrance thereof into a cylindrical valve seat 27 provided, said washer 26 will seal the end of said seat 27.

The valve stem 23 is suspended within a chamber 28 having a water supply intake means 29 through its wall. The valve proper controls the outlet of the chamber.

An aperture 30 provided in the bottom of the tank is at all times closed as is hereinafter set forth, by means of a buoyant ball 31 confined within a cage 32 affixed to the bottom of the tank adjacent the aperture 30. The cage 32 is provided with apertures 33 to permit water to pass through so as to float the ball and to empty the tank at the required time.

The ball is provided with a vertical stem 34 having a float 35 suspended about its upper free end within a cup 36 which is adjustably attached to a vertical partition 37 within the tank by a bolt 38 slidable in a channel 39.

The float 35 is provided with a hollow core 40 of sufficient size to permit the vertical movement of the float without binding the stem 34. The core projects slightly above the float so as to strike an adjustment nut 41 provided upon the upper end of the stem 34.

A relatively small tube 42 is provided to convey water from a connection with the intake 29 to the interior of the tank. A needle valve 43 is provided to control the flow of water through the tube.

The cylindrical valve seat 27 projects outwardly and downwardly from the chamber 28 and is threaded for connection with an elbow pipe fitting 44 to which may be attached the watering system, be that sprinkler, irrigation, or otherwise (not shown), in line with the object, purpose and use of the device.

Another relatively small tube 45 having a controlling needle valve 46 therein disposed, is provided to convey water from a connection with the elbow 44 to the interior of the tank.

A packing nut 47 is provided about the valve stem 23 to confine the water to the chamber 28.

In operation, the tank is conveniently placed with its movable exponents in the position shown supply by means of the intake 29. Needle valve 43 is set so that the desired length of time is permitted to elapse for the tank to become sufficiently full of water as to raise the float 16 which in turn lifts the valve stem 23 and thereby opening the ports 25 so as to permit water to pass from the intake 29 through the chamber 28, cylinder 27 and elbow 44 to the watering system.

The lapse of time required to fill the tank sufficiently to start and continue raising the float 16 determines the time for automatically controlling the start and shut off period of the watering system. This may be regulated at will by merely adjusting the needle valve 43 and the float 16 to accomplish the results desired.

Water entering the elbow 44 is under pressure so that a portion thereof passes through the tube 45 to the interior of the tank. The additional water thus supplied to the tank lifts the float 35 which in turn lifts the ball 31 from the aperture 30. Needle valve 46 controls the flow of water from the source of supply. It may be regulated and adjusted at will, the elapsed time between the lifting of the float 16 and float 35 determining the extent of time for the watering system, sprinkler, or otherwise as the case may be, to operate.

The ball 31 is held upon the aperture 30 by the weight of water, but when lifted by the float 35, it is sufficiently buoyant to remain off the aperture until sufficient water has drained from the tank so as to permit the float 16 to fall and close the valve ports 25. At this time, a new cycle of operation begins.

It is a comparatively easy matter to adjust the needle valves and float 16. Automatic starting and stopping of the mechanism is thus readily acomplished for any desired definite periods of time, and, without further care or attention.

Obviously, the device may readily be produced in different sizes and from materials easily obtainable in the open market and at no great cost.

I am aware that slight modifications may from time to time be made in the details of structure illustrated without departing, however, from the scope of the present invention, and as defined in the claims which are appended hereto. Hence, I do not limit my present invention to the exact description or embodiment of structure from that herein disclosed, but what I do claim is:

1. An automatic sprinkler control comprising a chamber having an intake adapted to be connected with a source of water supply under pressure, and an outlet adapted to be connected with a water distribution line, a normally closed valve for controlling said outlet, a tank having a discharge opening, a normally closed valve controlling said discharge opening, float actuated devices for operating said valves, by-pass means operable while the first named valve is closed for conducting water at a predetermined rate of flow into said tank whereby to operate one of the float actuated devices to open and so maintain the first named valve when the water in the tank reaches and remains at or above a predetermined level, and another by-pass means operable while the first named valve is open, for introducing water at a predetermined rate of flow into said tank whereby to operate the other float actuated device for opening the second named valve and maintaining it open until a predetermined amount of water in said tank passes out of the discharge opening.

2. An automatic sprinkler control comprising a chamber having an intake adapted to be connected with a source of supply of water under pressure, and an outlet adapted to be connected with a water distribution line, a normally closed valve for controlling said outlet, a tank having a discharge opening, a normally closed valve controlling said discharge opening, float actuated devices for operating said valves, by-pass means operable while the first named valve is closed for conducting water at a predetermined rate of flow into said tank whereby to operate one of the float actuated devices to open and so maintain the first named valve when the water in the tank reaches and remains at or above a predetermined level, and another by-pass means operable while the first named valve is open, for introducing water at a predetermined rate of flow into said tank whereby to operate the other float actuated device for opening the second named valve and maintaining it open until a predetermined amount of water in said tank passes out of the discharge opening, each of said by-pass means including a valve operable for controlling the rate of flow of water by-passing to said tank.

3. In an automatic sprinkler control, a chamber having an intake adapted to be connected with a source of supply of water under pressure and an outlet adapted to be connected with a water distribution line, a normally closed valve controlling said outlet, a tank associated with said chamber and having a discharge opening, by-pass devices associated with said chamber and tank for conducting water at predetermined rates of flow into said tank while the outlet control valve is opened as well as closed, a float actuated device in said tank for controlling said first named valve, a valve normally closing said discharge opening, and a float actuated device in said tank for operating the last named valve, including a rod connected with the last named valve, a float chamber in said tank, a float movable vertically in said chamber, and having an opening through which said rod extends and a stop member on the upper end of said rod whereby the rod is lifted when said float rises.

4. An automatic sprinkler control, comprising a chamber having an intake and an outlet respectively adapted for connection with a source of supply of water under pressure and a water distribution line, a valve normally closing said outlet, a tank associated with said chamber and having a discharge opening, a valve normally closing said opening, a by-pass asociated with said chamber and tank for conducting water to the tank when the outlet control valve is closed, a valve in said by-pass for controlling the rate of flow therein, a second by-pass associated with said chamber for conducting water to said tank while the outlet control valve is open, a valve in the second by-pass for controlling the rate of flow therein, and independent float actuated devices at different levels in said tank for operating the valves which control said outlet and said discharge opening.

FRANK Y. DONALDSON.

CERTIFICATE OF CORRECTION.

Patent No. 2,202,549.  May 28, 1940.

FRANK Y. DONALDSON.

It is hereby certified that error appears in the printed specification of the above numbered patent requiring correction as follows: Page 1, second column, line 1, after the word "desired" insert --change--; page 2, first column, line 10, after "shown" insert --in Figure 2. It is connected with the water--; and that the said Letters Patent should be read with this correction therein that the same may conform to the record of the case in the Patent Office.

Signed and sealed this 23rd day of July, A. D. 1940.

(Seal)

Henry Van Arsdale,
Acting Commissioner of Patents.